(12) United States Patent
Graham

(10) Patent No.: US 11,132,757 B2
(45) Date of Patent: Sep. 28, 2021

(54) SECURE IMAGE TRANSMISSION

(71) Applicant: Rosemount Aerospace Inc., Burnsville, MN (US)

(72) Inventor: Jason Graham, Prior Lake, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 71 days.

(21) Appl. No.: 16/551,941

(22) Filed: Aug. 27, 2019

(65) Prior Publication Data
US 2021/0065327 A1    Mar. 4, 2021

(51) Int. Cl.
*G06T 1/00*      (2006.01)
*H04W 12/033*    (2021.01)

(52) U.S. Cl.
CPC ......... *G06T 1/0021* (2013.01); *H04W 12/033* (2021.01)

(58) Field of Classification Search
CPC .......................... G06T 1/0021; H04W 12/0013
See application file for complete search history.

(56) References Cited

U.S. PATENT DOCUMENTS

| | | | |
|---|---|---|---|
| 7,767,950 B2 | 8/2010 | Perlman et al. | |
| 7,888,626 B2 * | 2/2011 | Slinger | G06T 1/0007 250/226 |
| 8,068,680 B2 | 11/2011 | Slinger et al. | |
| 8,243,353 B1 | 8/2012 | Gutin et al. | |
| 9,445,115 B2 | 9/2016 | DeWeert et al. | |
| 10,297,697 B1 | 5/2019 | Wahl | |
| 2008/0218851 A1 | 9/2008 | Chen et al. | |
| 2009/0095912 A1 * | 4/2009 | Slinger | G06T 1/0007 250/363.06 |
| 2015/0049210 A1 * | 2/2015 | Rachlin | H04N 5/357 348/208.11 |
| 2019/0197714 A1 | 6/2019 | Pau et al. | |

FOREIGN PATENT DOCUMENTS

KR    20100017234 A  *  2/2010  ............. G03B 35/02

OTHER PUBLICATIONS

Extended European Search Report dated Jul. 2, 2020, issued during the prosecution of European Patent Application No. EP 19215121.5.

* cited by examiner

*Primary Examiner* — Charles T Shedrick
(74) *Attorney, Agent, or Firm* — Locke Lord LLP; Joshua L. Jones; Scott D. Wofsy

(57) ABSTRACT

A method includes forming an image of a scene on a sensor through a coded aperture, wherein the coded aperture and sensor are optically coupled within an imaging platform to form a superpositioned, physically encoded image of the scene on the sensor. The method includes generating raw image data from the sensor representative of the superpositioned, physically encoded image of the scene, and transmitting the raw image data to a platform remote from the imaging platform so the raw data is encrypted during transmission. The method can include using the platform remote from the imaging platform to deconvolve the superpositioned, physically encoded image into a decoded image.

14 Claims, 2 Drawing Sheets

SECURE IMAGE TRANSMISSION

BACKGROUND

1. Field

The present disclosure relates to imaging, and more particularly to secure transmission of images.

2. Description of Related Art

In digital imagery, optics form an image of a scene on a sensor coupled to the optics. Pixels in the sensor convert the image into digital form, which initially exists as raw data. The raw data can be converted into other formats, e.g., for viewing, printing, analysis, and the like. In applications where security is required, the raw data can be digitally encrypted before transmission so that any unauthorized interception of the data will not result in unauthorized use of the image data.

The conventional techniques have been considered satisfactory for their intended purpose. However, there is an ever present need for improved systems and methods for secure transmission of images. This disclosure provides a solution for this need.

SUMMARY

A method includes forming an image of a scene on a sensor through a coded aperture, wherein the coded aperture and sensor are optically coupled within an imaging platform to form a superpositioned, physically encoded image of the scene on the sensor. The method includes generating raw image data from the sensor representative of the superpositioned, physically encoded image of the scene, and transmitting the raw image data to a platform remote from the imaging platform.

The coded aperture can include a mask with a plurality of transparent areas therethrough, wherein forming the superpositioned, physically encoded image of the scene on the sensor includes optically overlaying respective views of the scene from the transparent areas onto the sensor. The transparent areas can be distributed in the mask in a coded pattern. The method can include using the platform remote from the imaging platform to deconvolve the superpositioned, physically encoded image into a decoded image. The platform remote from the imaging platform can include a decryption key in machine readable form that is representative of a coded aperture pattern of the mask, wherein deconvolving the superpositioned, physically encoded image into a decoded image includes using the decryption key. The method can include displaying the decoded image of the scene. The method can include encrypting the raw data before transmitting the raw data, in an encrypted form, from the imaging platform and decrypting the raw data at the remote platform prior to deconvolving the superpositioned, physically encoded image.

The imaging platform can include an airborne platform, wherein the remote platform includes a land base, and wherein transmitting the raw image data includes wirelessly transmitting the raw image data from the airborne platform to the land base. Other types of platforms can be used for either the imaging or remote platform including land, airborne, sea, air, or space based platforms. The method can include using the imaging platform to deconvolve the superpositioned, physically encoded image into a decoded image. It is also contemplated that the method can include directing a resource to follow a targeting vector guiding the resource to a target in the decoded image without transmitting the decoded image out from the imaging platform.

A system includes an imaging platform having a coded aperture and a sensor optically coupled to the coded aperture to form a superpositioned, physically encoded image of a scene on the sensor. The imaging platform includes machine readable instructions configured to cause the imaging platform to generate raw image data from the sensor representative of the superpositioned, physically encoded image of the scene and transmit the raw image data to a platform remote from the imaging platform.

The coded aperture can include a mask with a plurality of transparent areas therethrough, wherein forming the superpositioned, physically encoded image of the scene on the sensor includes optically overlaying respective views of the scene from the transparent areas onto the sensor. The transparent areas can be distributed in the mask in a coded pattern. The system can include the platform remote from the imaging platform, wherein the platform remote from the imaging platform includes machine readable instructions configured to cause the platform remote from the imaging platform to deconvolve the superpositioned, physically encoded image into a decoded image. The platform remote from the imaging platform can include a decryption key in machine readable form that includes a coded aperture pattern of the mask, wherein deconvolving the superpositioned, physically encoded image into a decoded image includes using the decryption key. The machine readable instructions of the platform remote from the imaging platform can include machine readable instructions for displaying the decoded image of the scene.

The imaging platform can include machine readable instructions configured to cause the imaging platform to encrypt the raw data before transmitting the raw data, in an encrypted form, from the imaging platform. The platform remote from the imaging platform can include machine readable instructions configured to cause the platform remote from the imaging platform to decrypt the raw data at the remote platform prior to deconvolving the superpositioned, physically encoded image.

The imaging platform can include an airborne platform. The remote platform can include a land base. Transmitting the raw image data can include wirelessly transmitting the raw image data from the airborne platform to the land base. The machine readable instructions of the imaging platform can include machine readable instructions configured to cause the imaging platform to deconvolve the superpositioned, physically encoded image into a decoded image. The machine readable instructions of the imaging platform can include machine readable instructions configured to cause the imaging platform to direct a resource to follow a targeting vector guiding the resource to a target in the decoded image without transmitting the decoded image out from the imaging platform.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
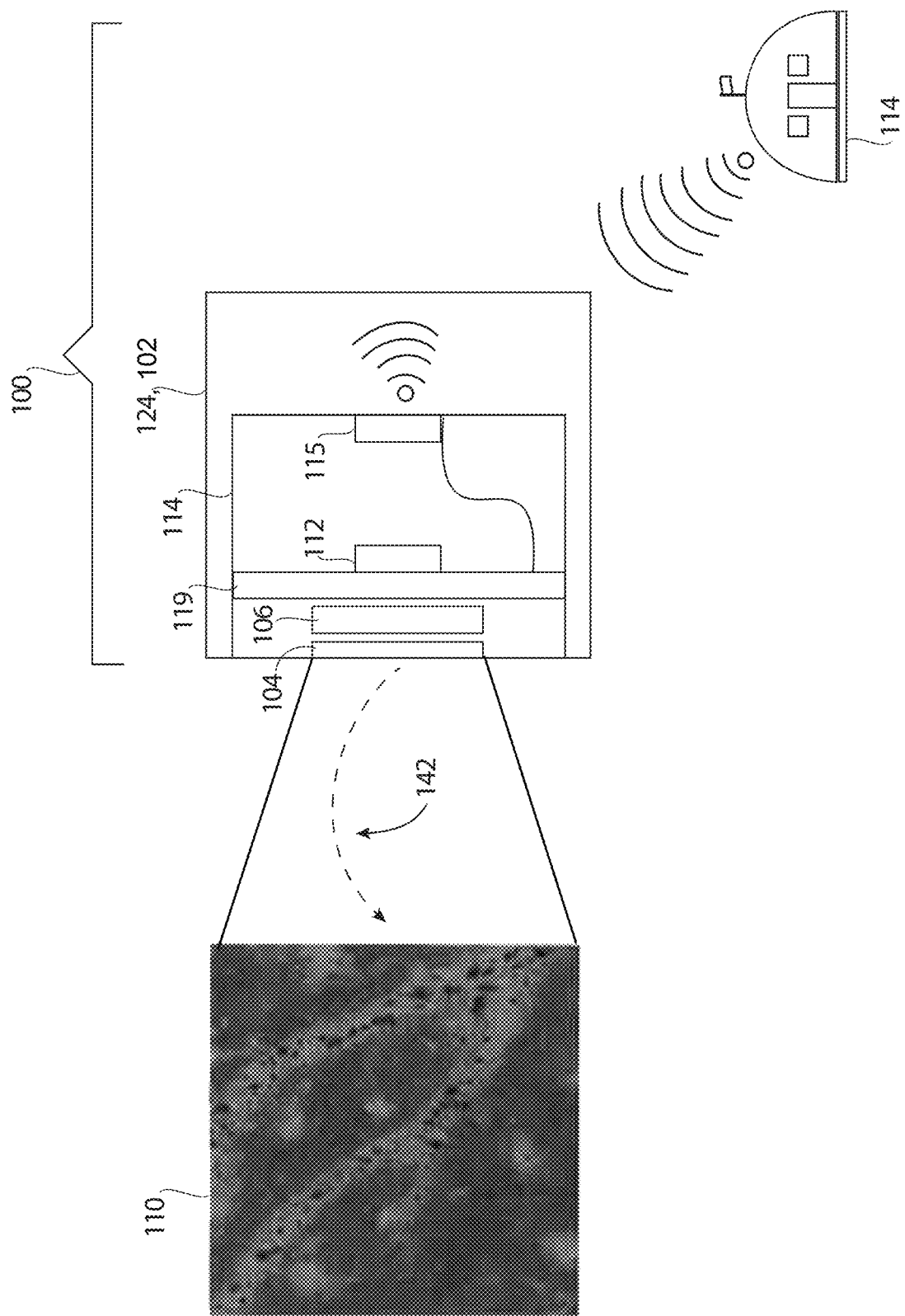
FIG. 1 is a schematic view of an embodiment of a system constructed in accordance with the present disclosure, showing the imaging platform and the remote platform.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to provide physical encryption of image data for secure transmission.

The system 100 includes an imaging platform 102 or camera platform having a coded aperture 104 and a sensor 106 (e.g. a focal plane array of 640 by 512 pixels, or any other suitable size, for imaging in visible, infrared, and/or any other suitable wave bands). The sensor 106 is optically coupled to the coded aperture 104 to form a superpositioned, physically encoded image 108 (labeled in FIG. 2) of a scene 110 on the sensor 106. The imaging platform 102 includes machine readable instructions, e.g., in a physical memory 112, configured to cause the imaging platform 102 to generate raw image data from the sensor representative of the superpositioned, physically encoded image 108 of the scene 110 and transmit the raw image data to a platform 114 that is remote from the imaging platform 102, as indicated in FIG. 2 by the arrow 126.

The coded aperture 104 can include a mask 116 with a plurality of transparent areas 118, which can include a transparent material, pinhole, or the like, therethrough. The mask 116 can be a single sheet where the non-transparent portions 119 are opaque or reflective. As schematically indicated in FIG. 2 with the arrows 120, 122, the transparent areas 118 form the superpositioned, physically encoded image 108 of the scene 110 on the sensor 106 of FIG. 1. This includes optically overlaying respective views of the scene 110 from the transparent areas 118 onto the sensor 106. The transparent areas 118 can be distributed in the mask in a coded pattern of positions, and their sizes and locations can vary as part of the coding of the pattern. Those skilled in the art having had the benefit of this disclosure will readily appreciate that the pattern is not limited to what is shown or to symmetrical patterns, but can be any suitable pattern that can be deconvolved using digital processing methods. The imaging platform 102 can include an airborne platform 124, e.g. a drone, piloted aircraft, guided munition, or the like. The remote platform 114 can include a sea-borne base, a land base, e.g., where users of the system 100 operate, or the like. Transmitting the raw image data, as indicated in FIG. 2 by arrow 126, can include wirelessly transmitting the raw image data from the airborne platform 124 to the platform 114, i.e., the imaging platform 102 includes wireless communications hardware 115, e.g., a circuit card assembly 117 can include the sensor 106, memory 112, and can include or be connected to the wireless communications hardware 115.

Figure 2:
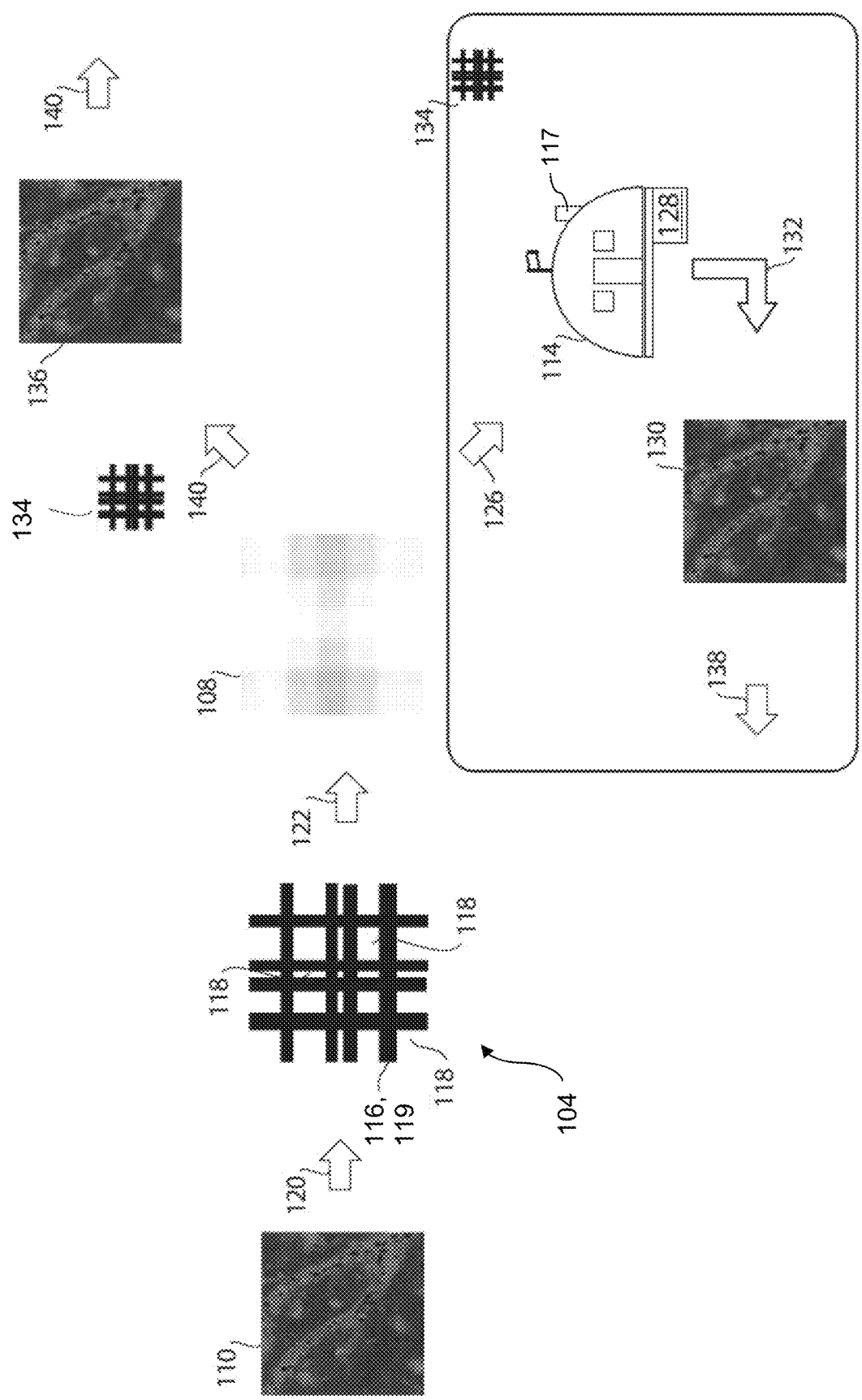
FIG. 2 is a diagram schematically showing an embodiment of a method in accordance with the present disclosure.

The remote platform 114 includes wireless communication hardware 117 and machine readable instructions, e.g. stored in a physical memory 128, configured to cause the platform 114 to receive and deconvolve the superpositioned, physically encoded image 108 into a decoded image 130, as indicated in FIG. 2 by arrow 132. The platform 114 can accomplish this by having a decryption key 134 (schematically indicated in FIG. 2) in machine readable form, e.g., stored in the physical memory 128, that includes the coded aperture pattern of the mask 116. The mathematics and computational overhead for the deconvolving process can be simplified and reduced if the pattern in the coded aperture 104 has diagonal symmetry. Deconvolving the superpositioned, physically encoded image 108 into a decoded image 130 includes using the decryption key 134. Any person or system not privy to the decryption key 134 will be impeded or prevented from making use of the raw data in the transmitted image 108. The machine readable instructions 128 can include machine readable instructions for causing the platform 114 to display, print, or otherwise output the decoded image 130 or information from the decoded image 130 as indicated in FIG. 2 by arrow 138.

With ongoing reference to FIG. 2, the machine readable instructions of the imaging platform 102 of FIG. 1 can be configured to cause the imaging platform 102 to encrypt the raw data before transmitting the raw data, in an encrypted form, from the imaging platform 102. The data underlying the superpositioned, physically encoded image 108 can itself be encrypted for a second layer of security before transmitting that raw data from the imaging platform 102. The machine readable instructions of the platform 114 can be configured to cause the platform 114 to decrypt the raw data at the remote platform 114 prior to deconvolving the superpositioned, physically encoded image 108.

Referring still to FIG. 2, the machine readable instructions of the imaging platform 102 of FIG. 1 can be configured to cause the imaging platform 102 to deconvolve the superpositioned, physically encoded image 108 into a decoded image 136 for use in the imaging platform 102, as indicated by the arrow 140 in FIG. 2 and utilizing the decryption key 134. The machine readable instructions 112 of the imaging platform 102 of FIG. 1 can be configured to cause the imaging platform 102 to direct a resource to follow a targeting vector 142, schematically indicated in FIG. 1, guiding the resource to a target in the decoded image 136 without transmitting the decoded image 136 out from the imaging platform 102. The deconvolving process used in the remote platform 114, based on the security key 134 can also be used in the imaging platform 102. The resource can be a physical resource, such as the airborne platform 124 itself, which can be a surveillance drone, guided munition, or the like. It is also contemplated that the physical resource can be something separate from the imaging platform 102, such as a forward observer, a guided munition launched from the airborne platform 124, an orbital asset, or the like. Other types of platforms can be used for either the imaging or remote platform including land, airborne, sea, air, space based platforms, or the like.

The methods and systems of the present disclosure, as described above and shown in the drawings, provide for secure transmission of images. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
forming an image of a scene on a sensor through a coded aperture, wherein the coded aperture and the sensor are optically coupled within an imaging platform to form a superpositioned, physically encoded image of the scene on the sensor;
generating raw image data from the sensor representative of the superpositioned, physically encoded image of the scene; and
transmitting the raw image data to a remote platform located remote from the imaging platform, wherein the imaging platform includes an airborne platform, wherein transmitting the raw image data includes wirelessly transmitting the raw image data from the airborne platform to the remote platform, further comprising using the imaging platform to deconvolve the superpositioned, physically encoded image into a decoded image, further comprising directing a mobile physical resource to move to follow a targeting vector guiding the mobile physical resource to a target in the decoded image without transmitting the decoded image out from the imaging platform.

2. The method as recited in claim 1, wherein the coded aperture includes a mask with a plurality of transparent areas therethrough, wherein forming the superpositioned, physically encoded image of the scene on the sensor includes optically overlaying respective views of the scene from the transparent areas onto the sensor.

3. The method as recited in claim 2, wherein the transparent areas are distributed in the mask in a coded pattern.

4. The method as recited in claim 1, further comprising using the platform remote from the imaging platform to deconvolve the superpositioned, physically encoded image into a decoded image.

5. The method as recited in claim 1, wherein the transparent areas are distributed in the mask in a coded pattern, wherein the platform remote from the imaging platform includes a decryption key in machine readable form that is representative of a coded aperture pattern of the mask, wherein deconvolving the superpositioned, physically encoded image into a decoded image includes using the decryption key.

6. The method as recited in claim 5, further comprising displaying the decoded image of the scene.

7. The method as recited in claim 5, further comprising:
encrypting the raw data before transmitting the raw data, in an encrypted form, from the imaging platform; and
decrypting the raw data at the remote platform prior to deconvolving the superpositioned, physically encoded image.

8. A system comprising:
an imaging platform comprising
a coded aperture; and
a sensor optically coupled to the coded aperture, the imaging platform being configured to form a superpositioned, physically encoded image of a scene on the sensor, the imaging platform including machine readable instructions configured to cause the imaging platform to:
generate raw image data from the sensor representative of the superpositioned, physically encoded image of the scene; and
transmit the raw image data to a remote platform located remote from the imaging platform wherein the imaging platform includes an airborne platform, wherein the remote platform includes a land base, wherein transmitting the raw image data includes wirelessly transmitting the raw image data from the airborne platform to the land base, wherein the machine readable instructions of the imaging platform include machine readable instructions configured to cause the imaging platform to deconvolve the superpositioned, physically encoded image into a decoded image, wherein the machine readable instructions of the imaging platform include machine readable instructions configured to cause the imaging platform to direct a mobile physical resource to move to follow a targeting vector guiding the mobile physical resource to a target in the decoded image without transmitting the decoded image out from the imaging platform.

9. The system as recited in claim 8, wherein the coded aperture includes a mask with a plurality of transparent areas therethrough, wherein forming the superpositioned, physically encoded image of the scene on the sensor includes optically overlaying respective views of the scene from the transparent areas onto the sensor.

10. The system as recited in claim 9, wherein the transparent areas are distributed in the mask in a coded pattern.

11. The system as recited in claim 9, further comprising:
the platform remote from the imaging platform, wherein the platform remote from the imaging platform includes machine readable instructions configured to cause the platform remote from the imaging platform to deconvolve the superpositioned, physically encoded image into a decoded image.

12. The system as recited in claim 8, wherein the transparent areas are distributed in the mask in a coded pattern, wherein the platform remote from the imaging platform includes a decryption key in machine readable form that is representative of a coded aperture pattern of the mask, wherein deconvolving the superpositioned, physically encoded image into a decoded image includes using the decryption key.

13. The system as recited in claim 12, wherein the machine readable instructions of the platform remote from the imaging platform include machine readable instructions for displaying the decoded image of the scene.

14. The system as recited in claim 12, wherein:
the imaging platform includes machine readable instructions configured to cause the imaging platform to encrypt the raw data before transmitting the raw data, in an encrypted form, from the imaging platform; and
the platform remote from the imaging platform includes machine readable instructions configured to cause the platform remote from the imaging platform to decrypt the raw data at the remote platform prior to deconvolving the superpositioned, physically encoded image.

* * * * *